United States Patent [19]
Kimura

[11] 4,383,410
[45] May 17, 1983

[54] EXHAUST SYSTEM OF A MULTI-CYLINDER INTERNAL COMBUSTION ENGINE

[75] Inventor: Susumu Kimura, Tokyo, Japan

[73] Assignee: Nissan Motor Co., Ltd., Yokohama, Japan

[21] Appl. No.: 237,483

[22] Filed: Feb. 23, 1981

[30] Foreign Application Priority Data

Mar. 3, 1980 [JP] Japan ............................ 55-26149[U]

[51] Int. Cl.³ ........................ F02M 25/06; F01N 3/28
[52] U.S. Cl. ...................................... 60/278; 60/302
[58] Field of Search ................................ 60/302, 278

[56] References Cited

U.S. PATENT DOCUMENTS

| 3,994,130 | 11/1976 | Sakai | 60/302 |
| 4,147,031 | 4/1979 | Tanuma | 60/278 |
| 4,151,715 | 5/1979 | Tachibana | 60/278 |
| 4,261,170 | 4/1981 | Suzuki | 60/302 |

FOREIGN PATENT DOCUMENTS

| 38371 | 2/1931 | France | 60/302 |
| 55-46026 | 3/1980 | Japan | 60/302 |

*Primary Examiner*—Douglas Hart
*Attorney, Agent, or Firm*—Lane, Aitken & Kananen

[57] ABSTRACT

An exhaust system for a multi-cylinder internal combustion engine comprises a catalytic converter having a monolithic catalyst, and an exhaust manifold having branch runners and a branch runner gathering section to which the catalytic converter is directly connected, the extensions of the axes of the branch runners meet a plane containing the inlet end surface of the catalyst at separate and different points, respectively, thereby uniformly supplying exhaust gas onto the entire inlet end surface of the catalyst.

10 Claims, 4 Drawing Figures

EXHAUST SYSTEM OF A MULTI-CYLINDER INTERNAL COMBUSTION ENGINE

BACKGROUND OF THE INVENTION

This invention relates to an improvement in an exhaust system for a multi-cylinder internal combustion engine, and more particularly to an improvement in an exhaust manifold to which a catalytic converter is directly connected.

It has been proposed to directly connect a catalytic converter for purification of engine exhaust gas to a branch runner gathering section of an exhaust manifold in view of relatively narrow engine compartment space and from the standpoint of engine compartment layout. Although such a proposition gives an advantage that the temperature of exhaust gas to be supplied to the catalytic converter is maintained higher to improve the purification by the catalyst, it is difficult to so supply the exhaust gas so as to be uniformly dispersed over the entire catalyst. Particularly in a case where a honeycomb type monolithic catalyst is used in the catalytic converter connected to the exhaust manifold branch runner gathering section, unless the exhaust gas is uniformly dispersed over the entire upstream or inlet end surface of the catalyst, the catalyst is excessively locally heated, which results in deteriorated catalytic performance and thermal damage of the catalyst, thereby losing the desired functions of the catalyst. As discussed above, good dispersion of the exhaust gas over the entire end inlet surface of the catalyst has been earnestly required.

BRIEF SUMMARY OF THE INVENTION

The exhaust system of the present invention comprises an exhaust manifold having branch runners corresponding to the engine cylinders of an engine, and a catalytic converter directly connected to the branch runner gathering section of the exhaust manifold. The catalytic converter contains therein a monolithic catalyst which has an inlet end surface onto which exhaust gas is supplied. The branch runners of the exhaust manifold are arranged to be so directed that the extensions of the axes thereof meet a plane containing the catalyst inlet end surface at separate and different points. Accordingly, the exhaust gases from the respective engine cylinders are supplied to different areas of the catalyst inlet end surface, and thereby uniformly and effectively use the entire catalyst to prevent the catalyst from its local excessive heating.

BRIEF DESCRIPTION OF THE DRAWINGS

The feature and advantages of the exhaust system according to the present invention will be more apparent from the following description taken in conjunction with the accompanying drawings in which like reference numerals designate the corresponding parts and elements, and in which.

DETAILED DESCRIPTION OF THE INVENTION

Figure 1:
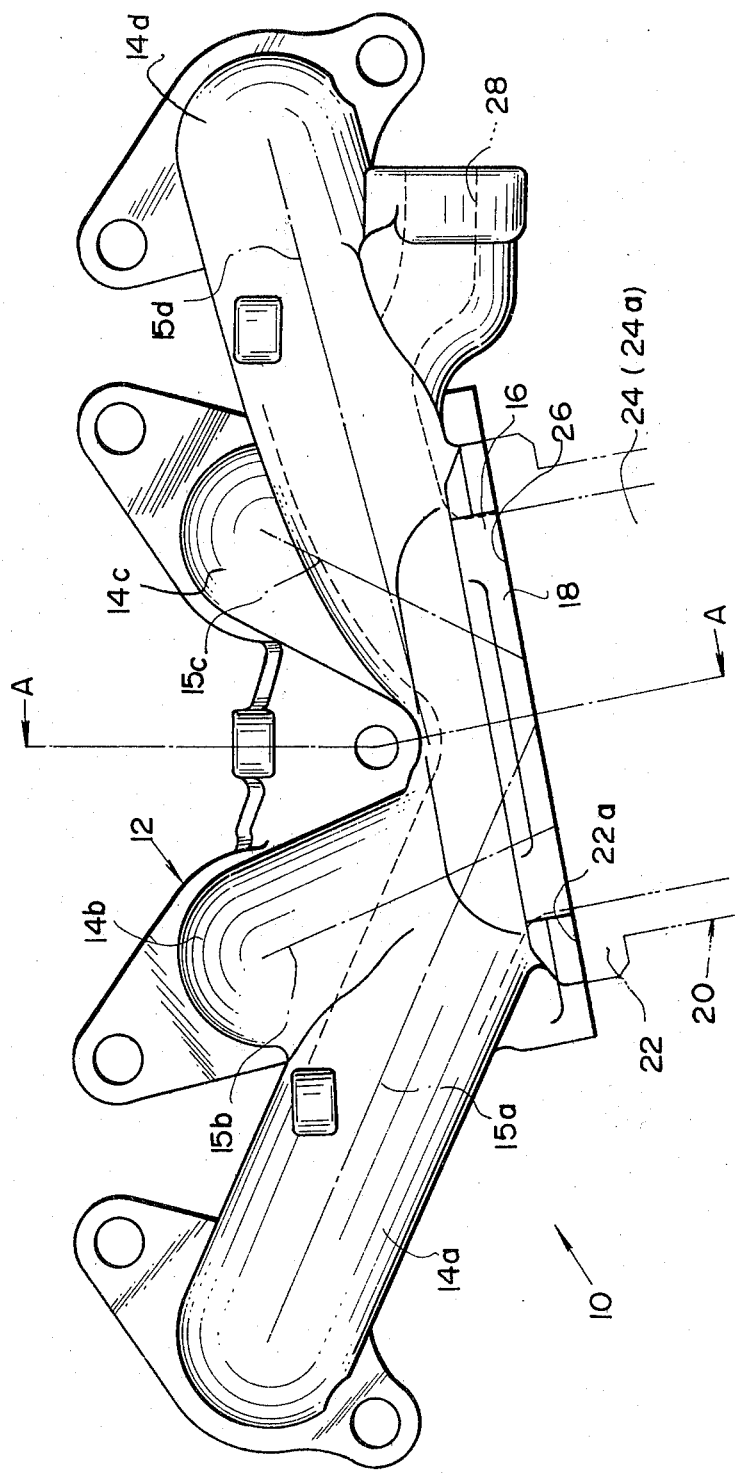
FIG. 1 is a front elevation showing an exhaust manifold of an embodiment in accordance with the present invention.
Figure 2:
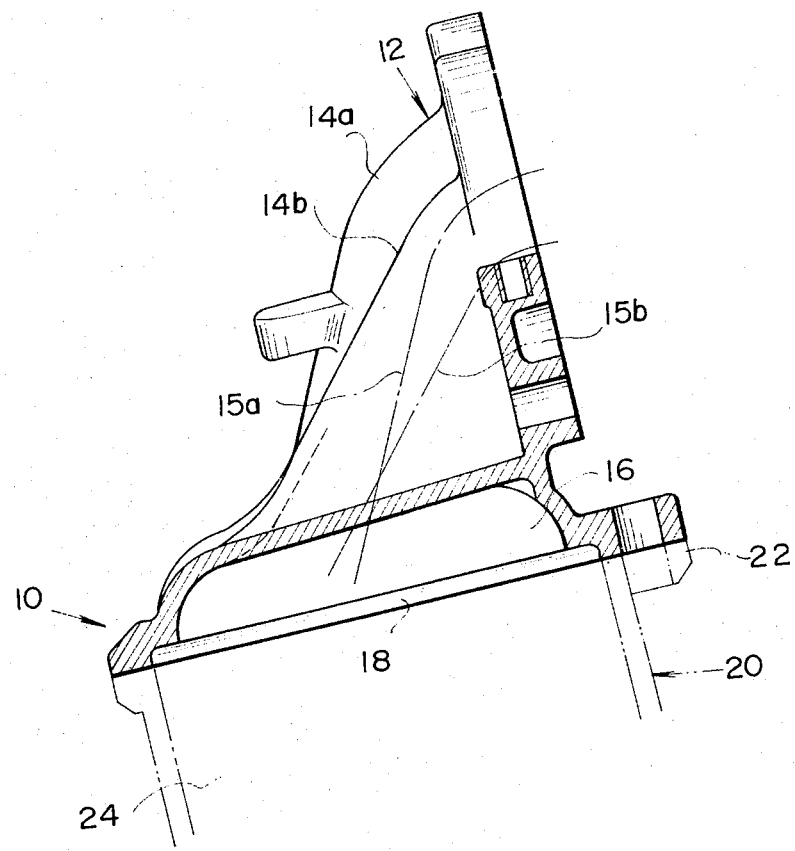
FIG. 2 is a cross-sectional view taken substantially along the line A—A of FIG. 1.
Figure 3:
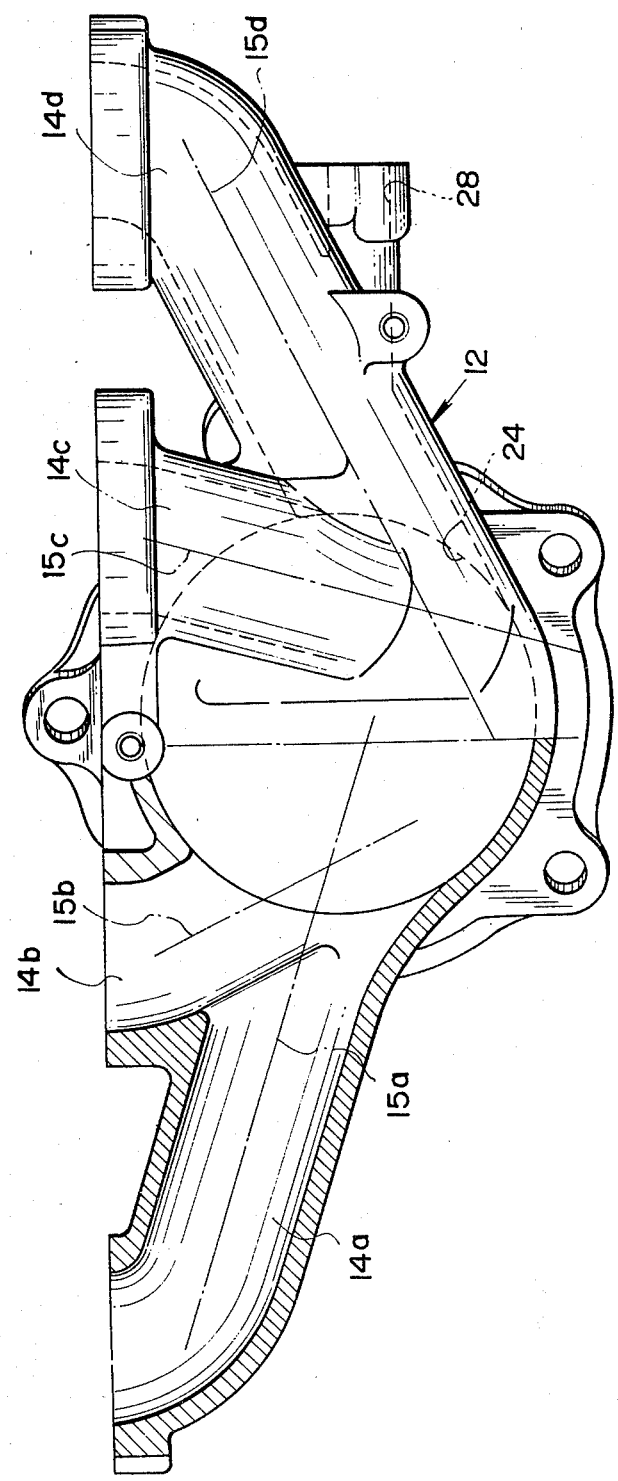
FIG. 3 is a plan view partly in section of the intake manifold of FIG. 1.

Referring now to the drawings, there is shown an embodiment of an exhaust system 10 according to the present invention, which system is used for a multi-cylinder internal combustion engine, for example, of an automotive vehicle. The exhaust system 10 comprises an exhaust manifold 12 which has, in this instance, four branch runners 14a, 14b, 14c and 14d, and a branch runner gathering section 16 at which the four branch runners are gathered to connect each other. Accordingly, each branch runner connects at its one end with the exhaust port of an engine cylinder (though not shown) and opens at the other end thereof to the gathering section 16. The gathering section 16 is formed with a circular outlet opening 18 through which gathered exhaust gas from the four branch runners is discharged.

A catalytic converter 20 is provided to catalytically purify the exhaust gas supplied though the outlet opening 18 of the exhaust manifold 12. The catalytic converter 20 comprises a cylindrical casing 22 which is securely connected to the wall of the exhaust manifold gathering section 16. A monolithic (honeycomb type) catalyst 24 is securely disposed within the casing 22. The catalyst 24 includes a honeycomb type catalyst carrier 24a and a catalytic material (not shown) carried by the carrier, so that the catalyst 24 is formed with a plurality of gas passages which are parallel with each other and arranged in the direction of the axis of the catalyst, piercing from an upstream or inlet annular end surface 26 of the catalyst 24 to a downstream or outlet annular end surface (not shown) of the catalyst 24. As shown, the inlet surface of the catalyst 24 lies on the same plane containing the annular surface 22a of the converter casing 22 which surface 22a contacts the wall of the intake manifold gathering section 16, so that the catalyst inlet surface 26 is in close proximity to the gathering section 16 and to all the branch runners 14a, 14b, 14c and 14d. It is to be noted that the four branch runners 14a, 14b, 14c and 14c are arranged to be so directed that the extensions of the axes 15a, 15b, 15c and 15d thereof meet at an acute angle a plane containing the catalyst inlet end surface 26 at separate and different points. In other words, the catalyst inlet end surface 26 is divided into areas which in number correspond to the number of the engine cylinders so that the exhaust gases from a plurality of engine cylinders are introduced to the corresponding and different areas, respectively.

In this case, it is preferable to so arrange the branch runners that the exhaust gases from a first group of branch runners 14a, 14b join each other prior to the exhaust gases reaching the catalyst inlet end surface 26, and likewise the exhaust gases from a second group of branch runners 14c, 14d join each other prior to the exhaust gases reaching the catalyst inlet end surface 26. Such an arrangement can prevent the formation of any unused region on the catalyst inlet surface 26 to which region exhaust gas does not strike in the above-mentioned case wherein the catalyst inlet surface is divided into the areas whose number corresponds to the number of the engine cylinders. This arrangement is realized by intersecting or joining the extensions of the axes 15a, 15b of the first group of branch runners 14a, 14b with each other at a point upstream of the catalyst inlet end surface 26 relative to the stream of exhaust gas, and by intersecting or joining the extensions of the axes 15c, 15d of the second group of the branch runners 14c, 14d with each other at a point upstream of the catalyst inlet end surface 25. Otherwise, this arrangement may be realized by removing each partition wall (for example, indicated by the character W in FIG. 4) located between the adjacent two branch runners, at a portion relatively separate from the catalyst inlet end surface 26.

Figure 4:
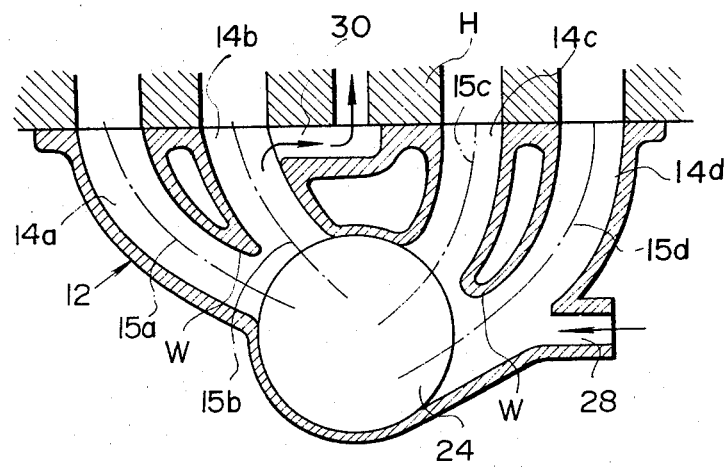
FIG. 4 is a transverse cross-sectional view of the exhaust manifold of another embodiment in accordance with the present invention.

Additionally, a secondary air introduction passage 28 is provided to supply secondary air to the catalytic converter 20. The secondary air passage 28 is formed to open to a section upstream of the gathering section 16, for example, to the inside of the branch runner 14a upstream of the gathering section 16 of the intake manifold 12. The passage 28 may be otherwise formed to open to the vicinity of the gathering section 16. This arrangement results in uniform distribution of the secondary air onto the inlet end surface 26 of the catalyst 24 by virtue of exhaust gas turbulence due to the joining of exhaust gas streams from the branch runners. In a case where so-called exhaust gas recirculation is carried out, it is preferable to locate an exhaust gas taking out or discharge port 30 at a portion sufficiently separate from the secondary air introduction passage 28 or the gathering section 26 of the exhaust manifold, for example in close proximity to the surface of the exhaust manifold 12 directly contacting with the side surface of a cylinder head H of the engine as shown in FIG. 4. With this arrangement, the exhaust gas recirculated back to the cylinders is preventing from becoming diluted with the secondary air from the secondary air introduction passage 28.

In operation, the exhaust gases discharged from the exhaust ports of the cylinder head of the engine are supplied respectively through the exhaust manifold branch runners 14a, 14b, 14c and 14d to the gathering section 16 or a portion upstream of the catalyst 24 of the catalytic converter 20. Then, the exhaust gases from respective branch runners are supplied to the different areas of the catalyst inlet end surface 26, respectively, since the extensions of the axes 15a, 15b, 15c and 15d of the branch runners 14a, 14b, 14c and 14d meet the catalyst inlet end surface 26 at the separate and different points. Accordingly, although the exhaust gas discharged from each engine cylinder is supplied to an area of the catalyst, the entire catalyst can be generally uniformly supplied with exhaust gases as a whole. This equalizes the loads applied to respective areas to which exhaust gases are supplied, and therefore prevents local excessive heating of the catalyst. Additionally, if the exhaust gases from the branch runners are joined with each other prior to reaching the catalyst 24, the diffusion of the exhaust gases from different branch runners takes place, so that the exhaust gas can be effectively supplied also to the border of the adjacent areas of the catalyst end surface to which areas exhaust gases from respective branch runners strike, thereby attaining uniform and effective use of the catalyst.

As appreciated from the above, with the exhaust system according to the present invention, the exhaust gases can be uniformly supplied to an entire monolithic catalyst which is located in close proximity to the branch runner gathering section of the exhaust manifold, in spite of employing such a simple configuration that the striking angles of the exhaust gases from respective engine cylinders onto the catalyst inlet end surface are different from each other. Hence, the catalyst can be prevented from its local excessive heating without using any special auxiliary devices, thereby improving the assembly process of the exhaust system and shortening the upstream section of the catalytic converter.

What is claimed is:

1. An exhaust system for a multi-cylinder internal combustion engine, comprising:
    a catalytic converter having a monolithic catalyst having an inlet end surface against which exhaust gas from the engine strikes;
    an exhaust manifold having a plurality of branch runners and a gathering section to which said branch runners are gathered to connect with each other, said exhaust manifold directly connecting at its gathering section with said catalytic converter so that the inlet end surface of said catalyst locates in close proximity to said gathering section, the extensions of the axes of the branch runners meeting a plane containing said inlet end surface of said catalyst at separate and different points, respectively; and
    means for causing the extension of the axis of each branch runner to meet at an acute angle said plane containing the catalyst inlet end surface.

2. An exhaust system as claimed in claim 1, wherein the extensions of the axes of at least two branch runners join each other at a point upstream of the catalyst inlet end surface relative to the stream of exhaust gas.

3. An exhaust system as claimed in claim 1, wherein the extensions of the axes of at least two branch runners cross each other at said point upstream of the catalyst inlet end surface.

4. An exhaust system as claimed in claim 1, said exhaust manifold further includes means defining a secondary air introduction passage through which secondary air is introduced into said exhaust manifold, said secondary air introduction passage opening to a portion upstream of said gathering section of said exhaust manifold.

5. An exhaust system as claimed in claim 3, wherein said secondary air introduction passage opens to the inside of one of said branch runners.

6. An exhaust system as claimed in claim 4, said exhaust manifold further includes means for defining a port through which a portion of the exhaust gas within said exhaust manifold is discharged to be recirculated back to cylinders of the engine, said port being so separate from said secondary air introduction passage as to prevent the dilution of the exhaust gas discharged from said port with the secondary air introduced through said secondary air introduction passage.

7. An exhaust system as claimed in claim 6, wherein said port is formed in close proximity to a surface of said exhaust manifold which surface directly contacting the side surface of a cylinder head of the engine.

8. An exhaust system for a multicylinder internal combustion engine, comprising:
    a catalytic converter having a monolithic catalyst having an inlet end surface against which exhaust gas from the engine strikes;
    an exhaust manifold having a plurality of branch runners and a gathering section to which said branch runners are gathered to connect with each other, said exhaust manifold directly connecting at its gathering section with said catalytic converter so that the inlet end surface of said catalyst locates in close proximity to said gathering section, the extensions of the axes of the branch runners meeting a plane containing said inlet end surface of said catalyst at separate and different points, respectively;

means for causing the extension of the axis of each branch runner to meet at an acute angle said plane containing the catalyst inlet end surface; and means for causing the extensions of the axes of at least two branch runners to meet each other at a point upstream of the catalyst inlet end surface relative to the stream of exhaust gas.

9. An exhaust system as claimed in claim 8, wherein the extensions of the axes of at least two branch runners join each other at a point upstream of the catalyst inlet and surface relative to the stream of exhaust gas.

10. An exhaust system as claimed in claim 8, wherein the extension of the axes of at least two branch runners cross each other at said point upstream of the catalyst inlet end surface.

* * * * *